UNITED STATES PATENT OFFICE.

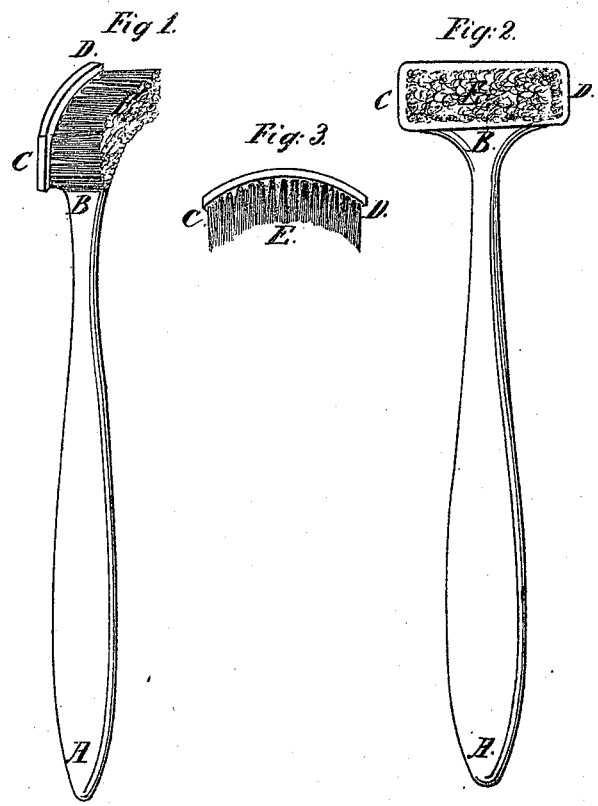

ROBERT NELSON, OF ALBANY, NEW YORK.

IMPROVEMENT IN TOOTH-BRUSHES.

Specification forming part of Letters Patent No. 43,597, dated July 19, 1864.

*To all whom it may concern:*

Be it known that I, ROBERT NELSON, dentist, of the city of Albany, State of New York, have invented a new and Improved Tooth-Brush; and I declare the following specification, with the drawings forming part of it, to be a full and complete description of my invention.

The first requisite for the preservation of the teeth is cleanliness. To produce this state or condition no instrument has ever been used equal to the modern tooth-brush; but this instrument as now constructed is faulty in shape, and requires much judgment and experience in its use to secure the perfect cleansing of the teeth without injury to the gums, and is therefore peculiarly unfitted for the service of young people and children. The reason of this is that from the arrangement of the brush (bristles) along the handle lengthwise, the instrument is made to be used horizontally across the teeth. Now, it is manifest that from the arrangement of the teeth, and their convex surfaces, the brush, in its horizontal movement, can only operate partially upon these convex surfaces, and passes altogether over the interstices between them, which contain the destructive elements that produce caries or decay. Besides this, there is, in brushing horizontally a continual tendency, when operating near the base of the teeth, to abrade and injure the gums and to wear down the soft surfaces of the teeth so exposed.

The object of my invention is to produce an instrument which shall remedy these defective operations and enable a person to clean the entire surface of the teeth, and by the same operation remove all offensive matter from between the teeth.

Figure 1 shows my improved brush in perspective; Fig. 2, in front view, and Fig. 3 gives a view of it endwise to show the curved form of the brush.

Similar letters denote the same parts of the instrument.

The stem or handle A B, which may be of any of the ordinary forms now in use, is surmounted by or shaped into a cross-head, C D.

The brush E (bristles) is formed upon or attached to this cross-head, the length of the brush, as shown in the drawings, being along the cross, so as to place it in reference to the handle at right angles to its usual position. The cross-head is not a flat piece, but curved in the direction of its length, as shown in Fig. 3, so as to make the inner surface of the brush to correspond, as nearly as may be, to the usual curve of the line of the teeth.

The instrument is to be moved when used upward and downward along and not across the teeth, and is to be made of various sizes and curves to adapt it to the varied forms of the teeth of children and adults.

It is manifest that from the form of the brush and its mode of use the points of its bristles will pass over every portion of the surface of the teeth, and penetrate into the spaces, not simply scouring them at the outward curve of their surfaces, and entirely passing over the spaces between them. It will be seen further that by a reasonably cautious use of the improved brush there can be no danger of abrading the gums at their points of adhesion to the teeth, which is a very common result of the use of the common brush.

This instrument is eminently calculated for the service of children at a period of life when the teeth are especially liable to caries. Brushes properly made on the proposed construction will be sure to remove the usual causes of decay, and preserve the teeth in a beautiful, wholesome, and sound condition.

What I claim as my invention, and desire to secure by Letters Patent, is—

The method of constructing tooth-brushes by arranging the brush (bristle) part thereof, in reference to the direction of the handle, in the manner described, and for the purposes set forth in the above specification.

ROBT. NELSON.

Witnesses:
RICHD. VARICK DEWITT,
ALLEN B. DURANT.